United States Patent Office 2,758,995
Patented Aug. 14, 1956

2,758,995

PREPARATION OF N-OXYDIETHYLENE BENZO-THIAZOLESULFENAMIDE

Frank A. V. Sullivan, Glenbrook, Conn., assignor to American Cyanamid Company, New York, N. Y., a corporation of Maine No Drawing. Application August 19, 1953,
Serial No. 375,296

2 Claims. (Cl. 260—247.1)

This invention relates to the sulfur vulcanization of rubber. More particularly, it is concerned with rubber accelerators and their preparation. Still more particularly, it is concerned with the preparation of benzothiazolesulfenamides, especially N-oxydiethylene benzothiazolesulfenamide.

Benzothiazolesulfenamides, especially N-oxydiethylene benzothiazolesulfenamide, have attained great importance in recent years as accelerators for sulfur vulcanization of rubber. While the action of N-oxydiethylene benzothiazolesulfenamide is excellent, the known methods for its preparation leave something to be desired. In general, all are unsatisfactory for one or more of several reasons.

One method of preparing benzothiazolesulfenamides is by reacting benzothiazole disulfide with an amine. While a fair yield of sulfenamide is obtained, only half of the disulfide molecule is utilized in its formation. The remainder is utilized in the formation of a substituted ammonium mercaptide. This process, therefore, requires separation of the sulfenamide from the impurity.

Another method of preparing these compounds comprises the so-called oxidative condensation of an amine and a metallic benzothiazole mercaptide in an aqueous solution using chlorine or hypochlorite. While fair yields are also obtained in this method, it has the disadvantage of requiring a huge excess of the amine. This is particularly undesirable when the amine is morpholine because of its high cost and because of the difficulty in recovering unconsumed morpholine from the aqueous solution. In addition, this process also results in a sulfenamide product contaminated with byproduct impurities which result from fluctuations in the acidity of the medium during addition of the oxidant.

Attempts have been made to eliminate by-product formation in the latter described process. One of these involves the use of anhydrous organic solvents as reaction mediums and using other oxidants. This, however, creates practical difficulties. The most serious arises in preparing an anhydrous dispersion of the metallic benzothiazolyl mercaptide in an organic solvent. Such a dispersion is difficult to stir and as a result is almost impossible to dehydrate thoroughly. This has been overcome to a certain extent by using very large volumes of solvent. Resultant excessive reaction volumes, however, are commercially impractical. Moreover, the condensation reaction is much slower under these conditions.

A recently suggested, and probably the most satisfactory method of preparing benzothiazolesulfenamides, comprises reacting free mercaptobenzothiazole with an N-monochlorinated amine in an inert organic solvent in the presence of an acid acceptor. The product produced is sulfenamide of high purity. Yield is quantitative based on mercaptobenzothiazole and exceedingly high, as compared with prior methods, based on the amine. A serious disadvantage to this otherwise successful process, however, lies in the difficulty of preparing and handling N-mono-chloroamines. The latter are quite unstable and in the presence of water or at elevated temperatures decompose violently.

It is an object of this invention to provide a method for preparation of N-oxydiethylene benzothiazolesulfenamide. It is a further object of this invention to provide a method of preparing N-oxydiethylene benzothiazolesulfenamide which is free of the disadvantages of known methods. Such a method should be capable of producing a product in high yield and of high purity. It should not require excessive amounts of reagents nor those which are difficult and/or hazardous to prepare and handle. In addition, the method should be such as to permit easy regeneration of any unconsumed reactants.

Surprisingly, these objects have been met in a simple and effective manner. Particularly is this true in view of known methods and extensive research conducted for a satisfactory method. In general, the process consists in first reacting free 2-mercaptobenzothiazole with morpholine. Resultant amine salt of mercaptobenzothiazole is then chlorinated in an inert solvent and in the presence of a suitable amount of an hydrogen chloride acceptor. After reaction is complete, the amine hydrochloride is separated and N-oxydiethylene benzothiazolesulfenamide recovered from the solvent by evaporation or in any other suitable manner.

An advantage of the process of the present invention is that free 2-mercaptobenzothiazole is employed rather than the sodium salt thereof. Surprisingly, when using the free mercaptan, highly objectionable and difficultly removable impurities obtained when treating the sodium salt in an aqueous alkaline medium are not encountered. Moreover, the characteristics of the free mercaptan are such that the practical difficulties encountered when treating the sodium salt in a non-aqueous medium are eliminated. In addition, and of particular importance, is the fact that free 2-mercaptobenzothiazole is a readily available commercial product while the sodium salt must be especially prepared.

The preparation of N-oxydiethylene benzothiazolesulfenamide by condensing N-chloromorpholine with free 2-mercaptobenzothiazole suffers, as noted above, from the serious disadvantage that N-chlorinated amines, under certain conditions, decompose violently. While the possibility of this occurring can be minimized by careful control and supervision of the preparation and handling of N-chloromorpholine, nevertheless, the explosive hazard is never eliminated. Surprisingly, it has now been found that this hazard can be completely avoided by first reacting morpholine with free 2-mercaptobenzothiazole and chlorinating the resultant mercaptobenzothiazole amine salt. The result is an excellent yield of high purity N-oxydiethylene benzothiazolesulfenamide obtained without the explosive hazard encountered when employing N-chloromorpholine.

The nature of the morpholine employed in the process of this invention is not critical. Wet morpholine as well as the anhydrous product may be safely employed. Morpholine, however, is most commonly available commercially as an aqueous solution because of the very nature of the reaction by which it is produced. Since, according to the present invention, the reaction product of morpholine and mercaptobenzothiazole is chlorinated, the presence of water does not involve the explosive hazard created when chlorinating morpholine. It is a decided advantage of this invention, therefore, that these commercially available aqueous solutions of morpholine may be safely employed in the process without first being subjected to an additional dehydration step as is necessary when chlorinating morpholine.

Chlorination of the morpholine salt of mercaptobenzothiazole is conducted in a substantially anhydrous medium. Accordingly, when starting with an aqueous solution of morpholine, mercaptobenzothiazole should first be reacted therewith to form its morpholine salt. This may then be dried and chlorinated in an anhydrous inert solvent in the presence of an acid acceptor. Alternatively, substantially dry morpholine may be reacted with mercaptobenzothiazole in situ in the same solvent to be used for chlorination. In either event, substantially stoichiometric equivalent quantities of morpholine and mercaptobenzothiazole are brought together and the resultant product chlorinated in an inert solvent.

The solvent employed in the chlorination reaction may be quite widely varied. It is restricted only by the requirement that it be substantially anhydrous and otherwise inert to the reactants under the reaction conditions. Any of the conventional organic solvents may be suitably employed. The chlorinated aliphatic hydrocarbons, for example, carbon tetrachloride and trichloroethylene, may be used. Likewise aromatic hydrocarbons such as benzene, its homologs and halogenated derivatives, thiophene, nitrobenzenes and the like are all suitable.

During chlorination, it is necessary to have present some material capable of neutralizing evolved hydrogen chloride. There are, of course, numerous materials which may be employed for this purpose. Among the best, however, are amines; for example, triethylamine, N-ethylmorpholine, dimethylbenzylamine, tributylamine, pyridine, N-methylpiperidine and the like. Morpholine itself has been found to be particularly efficient and is preferably employed in the process of this invention. An added feature of this process is the fact that any amine present in excess of that required to form the amine salt of mercaptobenzothiazole serves only as an acid acceptor. The amount of excess amine, therefore, need be substantially no more than that stoichiometrically required to neutralize hydrogen chloride produced during chlorination.

The process of this invention requires no specific apparatus other than that necessary for gas dispersion, condensation of the gaseous effluent and cooling of the reaction mixture. Moreover, there are no critical conditions which must be maintained. The desired temperature for chlorination is preferably between about 20°–40° C. However, temperatures below this as well as temperatures as high as about 60° C. may be satisfactorily employed. At lower temperatures, however, the reaction is too slow for commercial operation, while at higher temperatures the increase in reaction rate is not sufficient to warrant the greater heat requirements.

After chlorination is complete, by-product amine hydrochloride may be separated by filtration or any other suitable mechanical means. Product N-oxydiethylene benzothiazolesulfenamide remains in solution and may be easily recovered therefrom, for example, by distillation of the solvent.

Separated amine hydrochloride may be conveniently treated to easily and quite completely recover the amine from the hydrochloride in a form readily reusable. This may be accomplished, for example, by reslurrying the hydrochloride in an inert solvent and passing ammonia into the resultant mixture. Rapid neutralization takes place with liberation of the amine and formation of ammonium chloride. The latter may then be removed by filtration leaving the pure amine in solution. Alternatively, the amine hydrochloride may be treated with a concentrated aqueous solution of sodium hydroxide. The amine separates from the aqueous brine-caustic phase and may be easily drawn off. In either case, the recovered amine may be recycled.

The invention will be further illustrated by the following examples and melting points are of the crude product. All parts are by weight unless otherwise specified.

*Example 1*

16.7 parts of 2-mercaptobenzothiazole and 26.1 parts of morpholine are added to 300 parts of benzene. The resulting morpholinium mercaptobenzothiazole solution, containing unreacted morpholine, is then chlorinated at 20°–40° C. On completion of chlorination, 20 parts of 50% aqueous sodium hydroxide solution is added with agitation. The aqueous brine-caustic layer is separated and residual solution stripped of solvent. The yield of N-oxydiethylene benzothiazolesulfenamide is 92%, M. P. 70°–78° C.

The following examples illustrate the excellent results obtained when starting with a dilute solution of morpholine in water.

*Example 2*

A 25% solution of morpholine in water was treated with an equivalent amount of 2-mercaptobenzothiazole at 85° C. Resultant precipitate, the morpholine salt of mercaptobenzothiazole, was separated, washed and dried. Recovery was 83.5% of theory.

*Example 3*

50 parts of the mercaptobenzothiazole salt of Example 2 and 35 parts of morpholine were mixed with 600 parts of benzene. Chlorine was then passed into the resultant solution at 20°–30° C. After 30 minutes the reaction mixture was washed with water and solvent distilled off. Yield of N-oxydiethylene benzothiazolesulfenamide was 93%, M. P. 72°–78° C.

In order to illustrate the use of solvents other than benzene, the following example was run:

*Example 4*

83 parts of 2-mercaptobenzothiazole and 130 parts of morpholine were added to 1000 parts of toluene. Chlorination was effected at 15° C. After completion of chlorination, 110 parts of 50% NaOH solution were added and the reaction mixture stirred for 30 minutes. Aqueous brine-caustic layer was separated and residual solution treated to remove solvent. Recovery of product was 92%, M. P. 78°–80° C.

The following examples were run using an aqueous solution of the sodium salt of mercaptobenzothiazole and sodium hypochlorite as the oxidant.

*Example 5*

4.2 parts of sodium mercaptobenzothiazole and 6.5 parts of morpholine were added to 400 parts of water. Sodium hypochlorite was run into the resultant mixture at 45°–50° C. until precipitation ceased. Solids were separated, slurried in water and dried. Recovery of product was 27%, M. P. 85° C. Mercaptobenzothiazole disulfide precipitated with the product.

*Example 6*

Example 5 was repeated using 26.1 parts of morpholine. Recovery of product was 73%, M. P. 80°–85° C.

A comparison of Examples 1–4 with Examples 5 and 6 clearly illustrates the advantages of the process of the present invention. Examples 5 and 6 demonstrate that the oxidative-condensation procedure using sodium mercaptobenzothiazole in aqueous medium and sodium hypochlorite as the oxidant requires huge excesses of morpholine to depress disulfide formation. Even when using a morpholine to mercaptobenzothiazole mol ratio as great as 12:1, the yield of oxydiethylene benzothiazolesulfenamide is only about 73%.

I claim:

1. A process for preparing N-oxydiethylene benzothiazolesulfenamide which comprises reacting 2-mercaptobenzothiazole with morpholine, in a substantially anhydrous organic solvent whereby a solution of morpholinium mercaptobenzothiazole is obtained, treating said solution with chlorine, said chlorination being conducted in the presence of morpholine in amount not substantially greater than that stoichiometrically required to neutralize evolved hydrogen chloride, continuing treatment for time sufficient to substantially complete chlorination, and separating reaction products.

2. A process for preparing N-oxydiethylene benzothiazolesulfenamide which comprises reacting an aqueous solution of morpholine with 2-mercaptobenzothiazole under conditions to form and precipitate the morpholine salt of 2-mercaptobenzothiazole, separating said precipitate, dissolving separated solids in an inert organic solvent, chlorinating resultant solution in the presence of morpholine in amount not substantially greater than that stoichiometrically required to neutralize evolved hydrogen chloride, and separating and collecting reaction products.

References Cited in the file of this patent

UNITED STATES PATENTS

| 1,936,115 | North | Nov. 21, 1933 |
| 2,045,888 | Tschunkur et al. | June 30, 1936 |
| 2,271,834 | Carr | Feb. 3, 1942 |
| 2,382,793 | Howland | Aug. 14, 1945 |

FOREIGN PATENTS

| 586,351 | Germany | Oct. 20, 1933 |

OTHER REFERENCES

Carr et al.: J. Org. Chem. 14, 921–34 (1949); (C. A. 44:3976).